Feb. 28, 1939. R. L. LYONS Re. 21,016

BUTTON SEWING MACHINE

Original Filed Nov. 18, 1935 3 Sheets-Sheet 1

Inventor
Robert L. Lyons
by Wright Brown Quinby & May
Attys.

Feb. 28, 1939. R. L. LYONS Re. 21,016

BUTTON SEWING MACHINE

Original Filed Nov. 18, 1935 3 Sheets-Sheet 2

Inventor
Robert L. Lyons
by Wright, Brown, Quinby & May
Attys.

BUTTON SEWING MACHINE

Original Filed Nov. 18, 1935 3 Sheets-Sheet 3

Inventor
Robert L. Lyons
by Wright Brown Quinby & May
Attys.

Reissued Feb. 28, 1939

Re. 21,016

UNITED STATES PATENT OFFICE 21,016

BUTTON SEWING MACHINE

Robert L. Lyons, Waltham, Mass., assignor to American Button Sewing Machine Co., Waltham, Mass., a corporation of Massachusetts Original No. 2,033,080, dated March 3, 1936, Serial No. 50,258, November 18, 1935. Application for reissue September 29, 1937, Serial No. 166,338

21 Claims. (Cl. 112—112)

In the sewing on of four hole buttons by machine and using a single needle it has heretofore been the usual practice to stitch through one pair of holes and then shift the button and work relative to the needle to stitch through the other pair of holes without interruption of the machine cycle. This results in laying the thread diagonally across the outer face of the button between the two pairs of holes. This mars the appearance of the finished work and the thread so exposed on the diagonal cross over does not lie in a thread groove such as is commonly provided between the pairs of holes, so that it is not only very noticeable, but being exposed, it is likely to become broken, leaving unsightly thread ends on the front face of the button and impairing the securement of the button to the work.

In order to avoid the formation of this thread cross over, the stitching has been effected in two complete machine cycles in each of which stitches have been passed through one pair of holes only, the thread being knotted and then broken after the first stitches have been placed through the first pair of holes after the stopping of the machine. The work has then been moved relative to the needle to present the second pair of holes in the button and the machine again started to stitch through the second pair of holes. This operation, it will be noted, requires the stopping and re-starting of the machine in attaching each button and substantially increases the time and attention of the operator required.

The present invention has for an object to provide a continuous operation of a single needle machine for stitching through both pairs of holes in the button, but which avoids the formation of the thread cross over or the formation of projecting thread ends on the button face. This is accomplished by causing the thread to be parted when the shift of the work relative to the needle to present the second pair of holes in the button is to take place, there being also mechanism by which the provision of a sufficient length of starting end thread is provided for stitching through the second pair of holes.

For a more complete understanding of this invention, reference may be had to the accompanying drawings in which Figure 1 is a side elevation, certain parts being shown in dotted lines, of a button sewing machine embodying this invention, the parts being shown in the positions at the end of the stitching through the first pair of holes.

Figure 1:
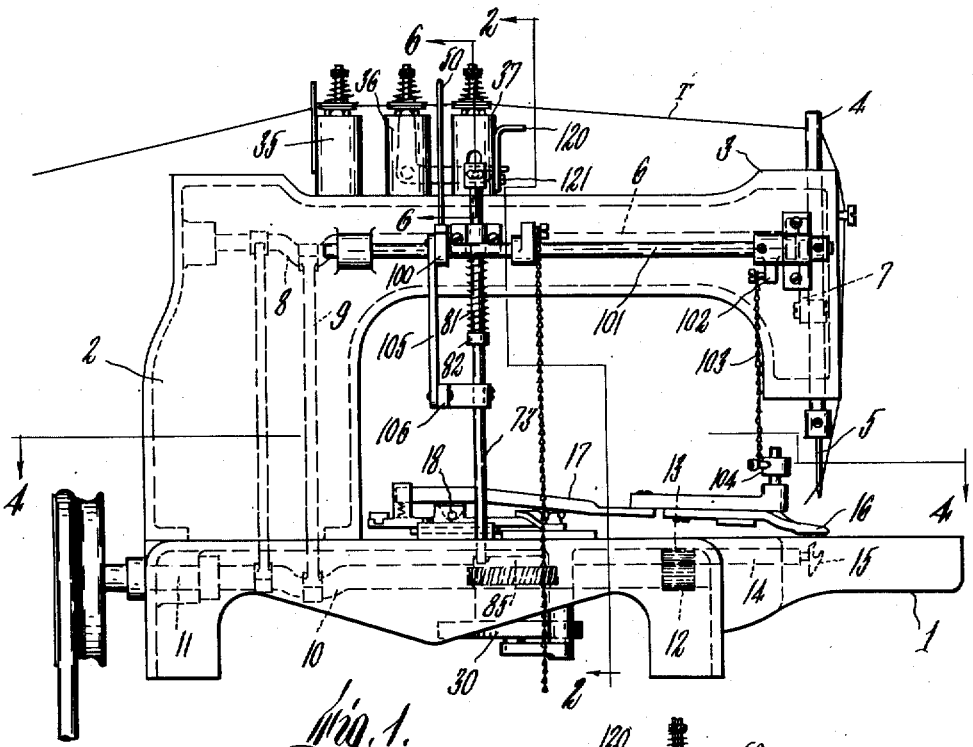

Referring first to Figure 1, at 1 is indicated a sewing machine bed of conventional form having a hollow sewing arm 2 extending upwardly therefrom at its rear end and extending forwardly and terminating in the sewing head 3. Within the sewing head is arranged the reciprocating needle bar 4 in the usual manner, this bar carrying the sewing needle 5 at its lower end. Any suitable means may be provided for reciprocating this needle bar, but as shown this is accomplished by the rotation of a needle shaft 6 having a suitable crank connection at 7 to the needle bar at its forward end and connected through a crank 8 and a connecting rod 9 with a crank 10 on the main drive shaft 11 in the base of the machine. This main shaft 11 also is connected through the meshing gears 12 and 13 to drive a shaft 14 provided with a loop taker 15 at its outer end, this being shown as a rotary looper which is driven in timed relation to the needle to take successive loops of thread therefrom and interengage them in chain stitch formation in the well known manner.

Figure 4:
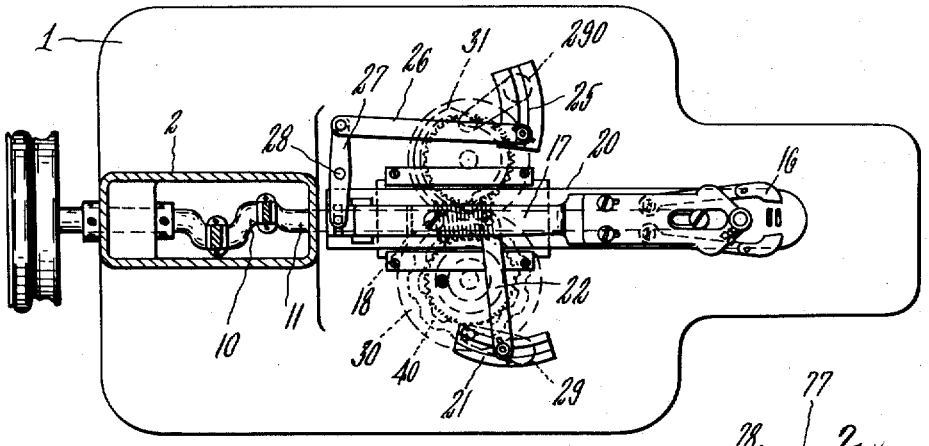
Figure 4 is a horizontal section on line 4—4 of Figure 1.

At 16 is shown a button clamp of conventional type which is mounted on an arm 17 pivoted at 18 for up and down movement to the upper face of a cloth plate 20 (see Figure 4). The cloth plate and the button holder may be vibrated from side to side so as to present the two holes of a pair in the button into the needle path in the well known manner, this motion, as shown in Figure 4, being accomplished through the rocking of an arm 21 connected through a link 22 with the cloth plate. Likewise, the button clamp and the work holder may be given a movement transverse to this vibratory motion in order to present first one and then the other pair of holes in operative relation to the sewing instrumentalities. This, as shown in Figure 4, is accomplished through a rock arm 25 connected through a link 26 and a lever 27 fulcrumed at 28 to the work holder in the usual manner. These links 21 and 25 are carried by rock shafts 29, 290, respectively, which extend down through the top face of the machine bed and are actuated in suitably timed relation by the cams 30 and 31, respectively, which are connected through suitable gearings with the shaft 11. This general arrangement, as heretofore described, is old and well known in button sewing machines.

The sewing thread is led from any suitable source (not shown) and first passes through a tension at 35 of any suitable type shown as secured on the top of the sewing arm. Forwardly of the tension 35 is arranged a tension 36, and forwardly of this tension 36 is another tension 37, which latter tension acts in the nature of a thread gripper. From this tension 37 the needle thread T passes to the upper end of the needle bar in the usual manner and down in the usual manner to the eye of the needle 5. The tensions 36 and 37 and the mechanism associated therewith perform the functions which are new in this machine.

Figure 9:
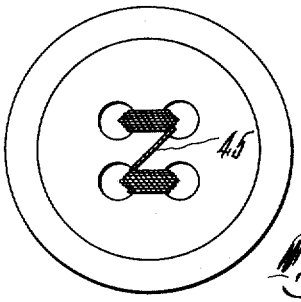
Figure 9 is a face view of a button sewed to work by a single needle showing the thread cross over on the forward face of the button.
Figure 10:
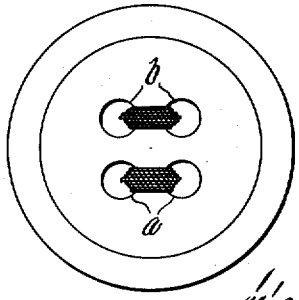
Figure 10 is a view similar to Figure 9, but without the cross over thread and as the button is sewed by the machine of the present invention.

The cam path 40 of the cam 30 is so formed as to produce lateral motion of the cloth plate and button holder laterally alternately between successive needle strokes to cause the needle to pass alternately through the two holes of a pair in the button and after the desired number of stitches have been placed, to cause the needle to pass through the same hole twice or for greater certainty of action three times, this in the well known manner effecting a knotting of the last stitch through this pair of holes. The thread is then broken near to the knot. The cam 31 then comes into action as the cloth plate and button holder resume their lateral jogging motion to move the cloth plate and button forwardly to present the other pair of holes in the button into the needle path, the needle continuing its motion through alternate holes of this second pair, placing stitches therein until at the last the needle passes twice through the holes of the second pair, thus to knot the second set of stitches. When the operation is complete, each of the pair of holes in the button such as *a* and *b* (Figure 10) has an independent set of stitches passed therethrough in place of leaving a cross over strand 45, as shown in Figure 9, which has been characteristic of work done by a single needle machine where the entire stitching operation has been done with a single operation of a single needle machine.

Figure 5:
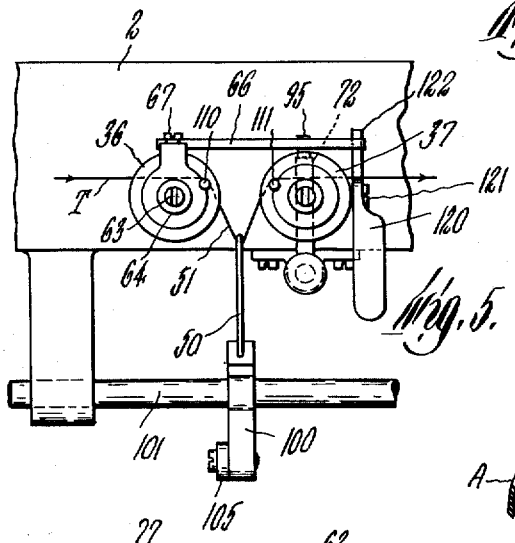
Figure 5 is a fragmentary top plan of the machine to a larger scale, the parts being in the positions of Figures 1 and 2.
Figure 7:
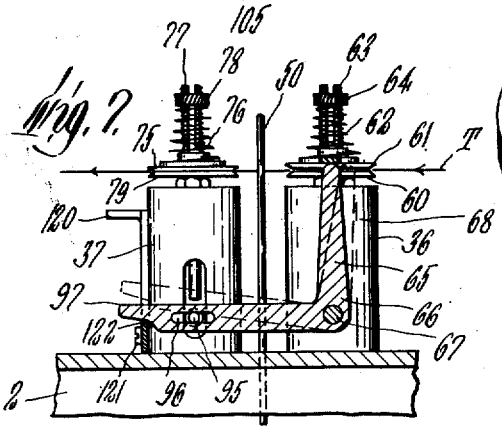
Figure 7 is a detail section on line 7—7 of Figure 6.

The tension 36, as shown best in Figures 5 and 7, has the usual lower and upper disks 60 and 61, the upper disk 61 being pressed downwardly toward the disk 60 as by means of a coil spring 62 surrounding a slotted and threaded post 63 on which is threaded an adjusting nut 64 by which the pressure of the disk 61 toward the disk 60 is adjustably determined. The thread T passes between these two disks in the usual manner. The upper disk 61, however, projects out at one side beyond the disk 60 so that it may be engaged from beneath by the upper end of an arm 65 forming part of a bell crank lever 66 fulcrumed at 67 on the supporting post 68 of the tension 36. As this bell crank lever 66 is rocked from the dotted line position shown in Figure 7 to the full line position, the upper end of the arm 65, engaging on the lower face of the disk 61, raises this disk 61 so as to release the tension on the thread T.

Figure 6:
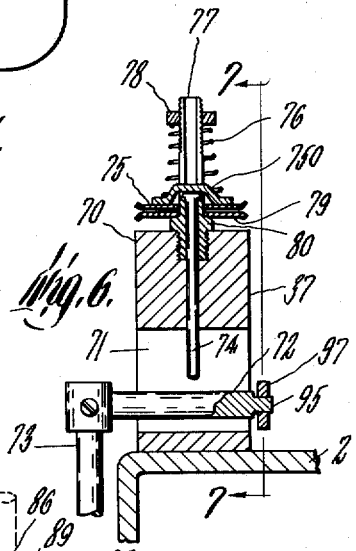
Figure 6 is a detail section to a larger scale on line 6—6 of Figure 1.

The tension 37 is shown somewhat in detail in Figure 6. The post 70 of this tension is slotted laterally as at 71 and within this slot rides a transverse post 72 secured to the upper end of a thrust rod 73. This post 72 is positioned beneath the lower end of a pin 74, which is slidable vertically through the post 70 and at its upper end engages a yoke 750 secured to the upper tension disk 75. This disk 75 is pressed downwardly as by a spring 76 surrounding the threaded and slotted post 77 similarly to the construction of the tension 36, the amount of pressure being adjusted by turning the threaded nut 78. The lower tension disk 79 is secured in fixed position as on the fixed sleeve 80. By lifting the thrust rod 73 to a sufficient extent, it will be evident that it will impinge on the lower end of the pin 74 and raise the upper disk 75 to release the tension on the thread T which passes between the upper and lower disks.

Figure 2:
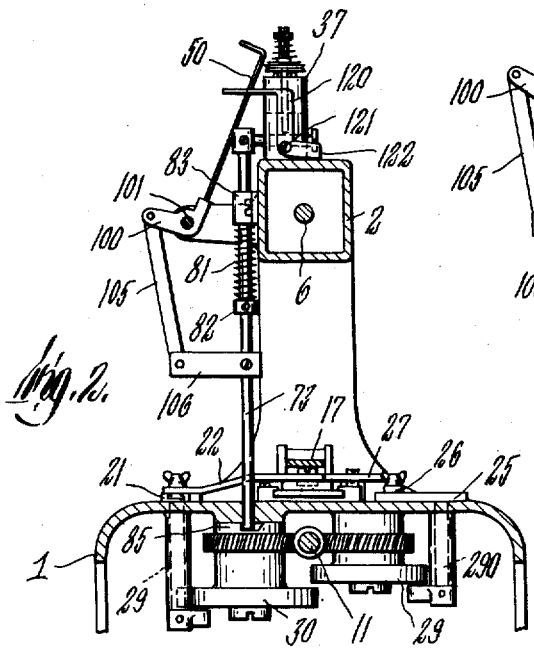
Figure 2 is a fragmentary section on line 2—2 of Figure 1.

The thrust rod 73 is normally urged downward into the position shown in Figure 2 as by means of a coil spring 81 (see Figures 1, 2 and 3) which surrounds the rod 73 and reacts between a collar 82 secured to this rod and the under face of a guide bearing 83 for the rod 73 and which is secured to the side of the sewing arm 2.

Figure 8:
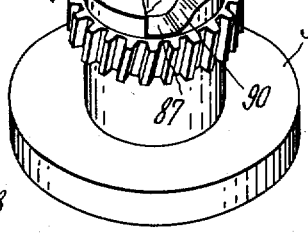
Figure 8 is a perspective view of a cam member, a portion of its follower being shown in dotted lines.

The lower end of the rod 73 projects through an opening in the top face of the machine bed 84 by which it is supported in line with a cam 85. The cam is shown, as in Figure 8, integral with the hub of the cam 30. The cam 85 is provided with a pair of substantially diametrically opposed edge notches 86 and 87, each having a sharply indented end face 89 and a sloping face 90, so that as the cam 85 is turned in the direction of the arrow A, as shown in Figure 8, the lower end of the rod 73 may ride off over an end face 89, thus to drop suddenly, and will later be lifted by riding up the inclined face 90, of one or the other of these notches. In the normal running position of the machine, the rod 73 rides on the elevated portions of its cam so that the upper tension disk 75 is lifted and the thread passes freely through this tension or gripper.

One end of the post 72 is formed with a pin projection 95 which extends through a slot 96 in the substantially horizontal arm 97 of the bell crank lever 66 so that when the tension 37 is open, as in the normal stitching position of the machine, the arm 65 is in its dotted line position in Figure 7, so that the tension 36 is closed.

Figure 11:
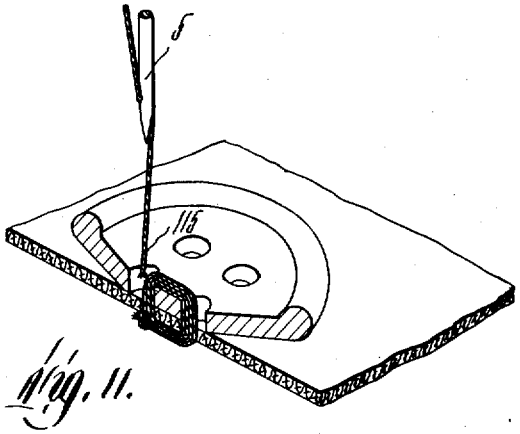
Figures 11, 12 and 13 are fragmentary perspectives showing successive operations of the machine at the end of the stitching operation through the first pair of holes and the placing of the first stitch in the second pair of holes.
Figure 12:
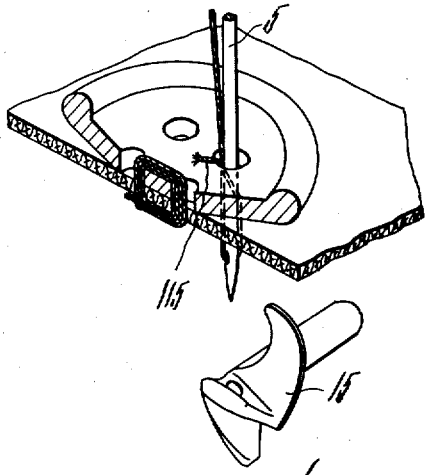

After the first series of stitches have been placed in one pair of holes in the button, the cam 85 reaches the position shown in Figure 8, where the rod 73 is allowed to drop into the notch 86, whereupon the thread is clamped in the tension 37 and is released in the tension 36. The tension 37 is so adjusted that the thread cannot pass therethrough when it is closed so that the thread is broken adjacent to the knot at the end of the stitching through the first set of holes in the button, as shown in Figure 11. This break is effected by the continued operation of the sewing instrumentalities after the thread has been clamped and more particularly by the tension created by the action of the looper in spreading the last thread loop, and it takes place in this thread loop at the knot just as it does when the button clamp is raised at the end of the stitching operation after a knotting needle stroke and the clamping of the thread in the well known manner. For the sake of simplicity the portion of the thread end initially extending through the knot has been omitted from the showing in Figures 11 and 12. By employing three passes of the needle through the same hole, the breaking of the thread is assured, it usually breaking during the second needle retraction, but if not, during the third.

Figure 3:
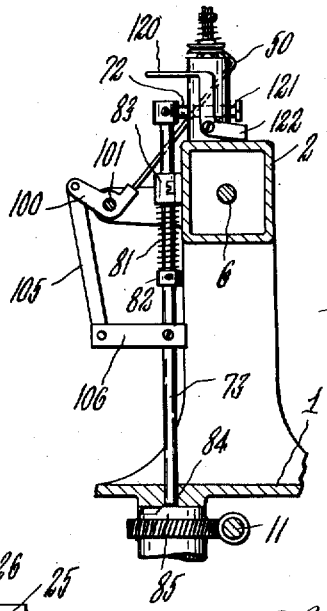
Figure 3 is a view similar to Figure 2, but with the parts shown in stitching position.

In order that there may be sufficient starting length to the thread end passing down through the needle for the succeeding stitching operation, means are provided for pulling off a length of thread between the tensions 36 and 37, and since the tension 36 is open when the tension 37 is closed, this pull off draws the thread through the tension 36. This is accomplpished by the finger 50 secured to a rock arm 100 which is shown as fulcrumed on the shaft 101 which is the rock shaft commonly employed for raising the button clamp at the end of the stitching operation, this shaft being connected through a crank arm 102 secured thereto and a chain 103 to a part 104 secured to the forward end portion of the button clamp. This arm 100 is shown as connected through a link 105 to a bracket piece 106 secured to the rod 73, so that as the rod 73 is allowed to drop into one of the notches 86 or 87 the arm 50 is brought across the thread path between the guide pins 110, 111 at the tensions 36 and 37 in the manner shown in Figure 5 to form the thread loop 51. As the rod 73 is again raised by riding up the inclined face 90 of the notch 86, the finger 50 is returned to its inactive position, as shown in Figure 3, the tension 36 is closed and the tension 37 opened. Thus the loop 51 is free to be drawn past the tension 37 for the start of the succeeding stitching operation, thus insuring sufficient length of starting thread end so that the second descent of the needle at the start of the stitching operation through the second set of holes in the button will not cause the thread to be pulled back through the eye of the needle, thus causing the needle to become unthreaded.

Figure 13:
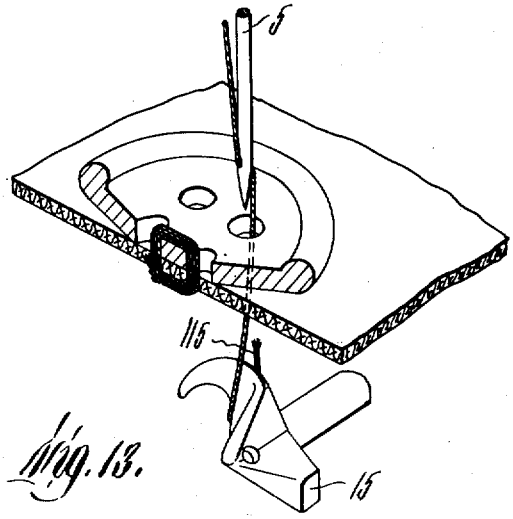

On the retraction of the needle after the second sewing stroke for the second pair of holes in the button, the tension 37 now being operative to prevent the slipping of the thread through the needle, the loop taker 15 engaging the first loop of thread from the needle draws this thread end out from the knotting loop of the first set of stitches and across the bridge of the button when the button is moved to present the holes of the second pair into the needle path, as shown at 115 in Figure 13, down through the button in one of the second set of holes so that it does not show on the completed work. After this, the tension 37 is opened, the tension 36 is closed, and the thread length previously pulled off between these tensions is made available for the resumption of stitching, being free to be pulled past the tension 37. The stitching then proceeds in the ordinary manner to complete the placing of stitches in the second set of holes in the button and through the work. At the end of this stitching the needle is caused to pass twice through the same hole, thus knotting the thread and the machine comes to rest automatically at the end of the entire machine cycle with the tension 36 open, the tension 37 closed, and a loop of thread 51 pulled off for the start of the succeeding sewing operation. The thread is thus clamped so that on raising of the clamp the thread is broken adjacent to the knot placed at the end of the second set of stitches. The lower end of the rod 73 is then resting in the notch 87 of the cam 85. In order to permit lifting of the rod 73 by the operator when desired, a finger lever 120 may be employed fulcrumed at 121 on the tension post 70 and having an end portion 122 underlying the end of the bell crank lever arm 97.

It will thus be seen that in a single complete machine cycle two independent sets of threads have been placed, each set passing through the holes of one pair in the button, both sets of stitches have been knotted at the end of their respective stitching operations, and no cross over thread or thread ends are left on the face of the button. This has been done without stopping the machine, or without any attention on the part of the operator.

From the foregoing description of an embodiment of this invention, it should be evident to those skilled in the art that various changes and modifications might be made without departing from the spirit or scope of this invention as defined by the appended claims.

I claim:

1. A button sewing machine for four hole buttons, which comprises instrumentalities including a single needle, means for actuating said instrumentalities, means for holding a button, and means for relatively moving said instrumentalities and holder during a single complete machine cycle to sew a button held by said holder to the work and to form a knotting stitch and then sever the needle thread at such time that the securement of the button comprises two disconnected sets of stitches, the first set being completed with a knot.

2. A button sewing machine for four hole buttons, which comprises instrumentalities including a single needle and thread controlling devices, means for actuating said instrumentalities, means for holding a button, and means for relatively moving said needle and holder and actuating said devices during a single complete machine cycle to sew a button held by said holder to the work and to form a knotting stitch and then sever the needle thread at such time that the securement of the button comprises two disconnected sets of stitches each set passing through two holes of the button, the first set being completed with a knot.

3. A button sewing machine for four hole buttons, which comprises sewing instrumentalities, means for actuating said instrumentalities, means for holding a button, and means for relatively moving said instrumentalities and holder during a single complete machine cycle to stitch through one and then through the other pair of holes in the button, said machine including means to form a knotting stitch and then cause severance of the stitching thread while the machine is running at the end of the stitching through said one pair of holes.

4. A button sewing machine for four hole buttons, which comprises sewing instrumentalities, means for actuating said instrumentalities, means for holding a button, and means for relatively moving said instrumentalities and holder during a single complete machine cycle to stitch through one and then through the other pair of holes in the button, said machine including means to form a knotting stitch and then cause severance of the stitching thread between the stitching through the one and through the other pair.

5. In a sewing machine for sewing four hole buttons to work, sewing instrumentalities, means for moving said instrumentalities and a button being sewed relatively during a single operative machine cycle to stitch through one and then through the other of a pair of holes in the button ending with a knotting stitch for each pair of holes, and means cooperating with said instrumentalities and moving means to cause severance of the thread after the knotting stitch through the one pair of holes and while the operation of the machine continues, whereby the button is sewed in a continuous machine operation by two separate sets of stitches each ending with a knot, one set passing through each pair of holes in the button.

6. In a machine for sewing four hole buttons to work, sewing instrumentalities including a needle, button holding means, means for moving said instrumentalities and holding means relatively during a single operative machine cycle to cause said needle to pass through the holes of one pair in the button ending with a knotting stitch and thereafter through the holes of the other pair, and means cooperating with the said instrumentalities and holding means to cause severance of the needle thread after the needle has completed its passage through the holes of the first pair.

7. A machine for sewing four hole buttons to work, which comprises sewing instrumentailties including a needle, means for holding a button, means for moving said holding means and instrumentalities relatively to cause said needle to pass through the holes of one and then the other pair of holes in the button during a sewing operation with at least the last two strokes for each pair through the same hole of said pair, means for gripping the thread passing through the needle, and means for actuating said gripping means to cause said thread to be gripped and severed between the needle and the work with the thread knotted before the needle passes through the other pair of holes, whereby the button is sewed to the work by two independent sets of stitches each completed with a knot, the stitches of each set passing through the holes of one pair in the button.

8. A machine for sewing four hole buttons to work, which comprises sewing instrumentalities including a needle, means for holding a button, means for moving said holding means and instrumentalities relatively to cause said needle to pass through the holes of one and then the other pair of holes in the button during a sewing operation, a thread tension through which the thread passes on its way to said needle, a thread gripper between said tension and said needle, and means acting to hold said gripper open while said instrumentalities are placing stitches through said one pair of holes and for holding said gripper closed during the relative motion of said holder and instrumentalities to change the needle from the one to the other pair of holes and cause severance of the thread prior to such relative motion.

9. A machine for sewing four hole buttons to work, which comprises sewing instrumentalities including a needle, means for holding a button, means for moving said holding means and instrumentalities relatively to cause said needle to pass through the holes of one and then the other pair of holes in the button during a sewing operation, a thread tension through which the thread passes on its way to said needle, a thread gripper between said tension and said needle, a thread pull-off between said thread tension and gripper, and means acting to hold said gripper open, said tension on, and said pull-off inoperative during the placing of stitches through said holes in the button and to close said gripper, to release said tension, and to actuate said pull-off to draw a supply of needle thread through said tension for the start of the succeeding stitch laying through the second pair of holes at the end of the stitching through the first pair of holes and to hold said gripper closed during the relative motion of said instrumentalities and holder to change the needle from one to the other pair of holes to thereby cause severance of the thread between the needle and the work and an adequate thread supply for the start of the subsequent stitch-placing operation.

10. A single thread sewing machine for securing four hole buttons, comprising sewing instrumentalities including a needle and a loop taker, button holding means, means for moving said holder and instrumentalities relatively in a single continuous machine operation to cause said needle to pass through each of the holes in one pair in the button to place stitches therein and to knot the last stitch and then to pass through each of he holes of the other pair to place stitches therein, said machine having means acting after the knotting operation and before said holding means and instrumentalities are moved to position the needle to place stitches through the other pair of holes to cause severance of the needle thread adjacent to the knot.

11. A single thread sewing machine for securing four hole buttons, comprising sewing instrumentalities including a needle and a loop taker, button holding means, means for moving said holder and instrumentalities relatively in a single continuous machine operation to cause said needle to pass through each of the holes in one pair in the button to place stitches therein and to knot the last stitch and then to pass through each of the holes of the other pair to place stitches therein, said machine having means acting after the knotting operation and before said holding means and instrumentalities are moved to position the needle to place stitches through the other pair of holes to cause severance of the needle thread adjacent to the knot and the subsequent retraction of the free end of the needle thread during the subsequent stitching operation by said loop taker to a position back of the outer face of the button.

12. A sewing machine for securing four hole buttons to work, comprising sewing instrumentalities including a needle, a button holder, means for relatively moving said needle and holder to present each of a pair of holes in the button into the needle path to place stitches through said pair of holes, and means acting after the desired number of such stitches have been placed and during a continuous operation of the machine to move said holder and needle relatively transversely of said first relative movement to present the holes of the other pair in the button to the needle, said machine including means effecting the knotting and severance of the needle thread between the needle and the work before such second-mentioned relative motion.

13. A sewing machine for securing four hole buttons to work, comprising sewing instrumentalities including a needle, a button holder, means for relatively moving said needle and holder to present each of a pair of holes in the button into the needle path to place stitches through said pair of holes ending with a knotting stitch, and means acting after the desired number of such stitches have been placed and during a continuous operation of the machine to move said holder and needle relatively transversely of said first relative movement to present the holes of the other pair in the button to the needle, and means acting to so grip the thread that the thread is severed adjacent to the knot before such second-mentioned relative motion adjacent to the work.

14. A sewing machine comprising instrumentalities including a needle, means for actuating said instrumentalities, means for holding an article to be sewed to work, and means for relatively moving said instrumentalities and holder during a single complete machine cycle to sew the article to the work and to knot and sever the needle thread at such time that the article is secured to the work by a plurality of disconnected sets of stitches each set being completed with a knot.

15. A single thread sewing machine for securing four hole buttons, comprising sewing instrumentalities including a needle and a loop taker, a button holder, means for moving said holder and instrumentalities relatively in a single continuous machine operation to cause said needle to pass through each of the holes in one pair in the button to place stitches therein and to knot the last stitch and then to pass through each of the holes of the other pair to place stitches therein, said machine having means acting after the knotting action to cause severance of the needle thread adjacent to the knot.

16. A single thread sewing machine for securing four hole buttons, comprising sewing instrumentalities including a needle and a loop taker, a button holder, means for moving said holder and instrumentalities relative in a single continuous machine operation to cause said needle to pass through each of the holes in one pair in the button to place stitches therein and to knot the last stitch and then to pass through each of the holes of the other pair to place stitches therein, said machine having means acting after the knotting action to cause severance of the needle thread adjacent to the knot and the subsequent retraction of the free end of the needle thread during the subsequent stitching operation by said loop taker to a position back of the outer face of the button.

17. A machine for sewing four hole buttons to work, which comprises sewing instrumentalities including a needle, means for holding a button, means for moving said holding means and instrumentalities relatively to cause said needle to pass through the holes of one and then the other pair of holes in the button during a sewing operation with at least the last two strokes of the needle through the same hole in each pair to effect a knotting stitch, a thread tension through which the thread passes on its way to said needle, a thread gripper between said tension and said needle, and means acting to hold said gripper open while said instrumentalities are placing sewing stitches through said pair of holes and for holding said gripper closed during the knotting and the relative motion of said holder and instrumentalities to change the needle from one to the other pair of holes to cause severance of the thread and the removal of the thread end from the knot formed by the previous knotting stitch.

18. A machine for sewing four hole buttons to work, which comprises sewing instrumentalities including a needle, means for holding a button, means for moving said holding means and instrumentalities relatively to cause said needle to pass through the holes of one and then the other pair of holes in the button during a sewing operation with at least the last two strokes of the needle in the same hole in the pair to effect a knotting stitch, a thread tension through which the thread passes on its way to said needle, a thread gripper between said tension and said needle, a thread pull-off between said thread tension and gripper, and means acting to hold said gripper open, said tension on and said pull-off inoperative during the placing of stitches through said holes in the button and to close said gripper to release said tension, and to actuate said pull-off to draw a supply of needle thread through said tension for the start of the succeeding stitch-laying through the second pair of holes at the end of the sewing stitches through the first pair of holes, and to hold said gripper closed during the knotting and the relative motion of said instrumentalities and holder to change the needle from one to the other pair of holes to thereby cause knotting and severance of the thread between the needle and the work and an adequate thread supply for the start of the subsequent stitching operation.

19. A button sewing machine for four hole buttons which comprises instrumentalities including a single needle, means for holding a four hole button, means for relatively moving said instrumentalities and holding means during a single complete machine cycle to sew a button held by said holder to the work with chain stitches first through one pair of holes in the button ending with a knotting stitch, and then through the holes of the other pair, a thread clamp, and means to actuate said clamp to clamp the thread in time to cause the thread to be severed adjacent to the knot and the thread end to be drawn out therefrom by the subsequent actuation of the sewing instrumentalities before the placing of sewing stitches in the other pair of holes in the button.

20. A button sewing machine for four hole buttons, which comprises instrumentalities including a single needle, means for holding a four-hole button, means for relatively moving said instrumentalities and holding means during a single complete machine cycle to sew a button held by said holding means to the work with chain stitches first through one pair of holes in the button ending with a knotting stitch, and then through the holes of the other pair, a thread clamp, and means to actuate said clamp to clamp the thread in time to cause the thread to be severed adjacent to the knot and the thread end to be drawn out therefrom and over the bridge of the button and down through one of the holes in the other pair in the button by the subsequent actuation of the sewing instrumentalities, before the placing of sewing stitches in the other pair of holes in the button.

21. A button sewing machine for four-hole buttons, which comprises instrumentalities including a single needle, means for holding a four-hole button, means for relatively moving said instrumentalities and holding means during a single complete machine cycle to sew a button held by said holding means to the work with chain stitches first through one pair of holes in the button ending with a knotting stitch, and then through the holes of the other pair, a thread clamp, and means to actuate said clamp to clamp the thread in time to cause the thread to be severed adjacent to the knot and the thread end to be drawn out therefrom and over the bridge of the button and down through one of the holes in the other pair in the button by the subsequent actuation of the sewing instrumentalities before the placing of sewing stitches in the other pair of holes in the button, said machine also including means effective to draw off thread from the supply while the thread is clamped and available to said instrumentalities after the opening of said clamp for the resumption of stitching through the second pair of holes in the button.

ROBERT L. LYONS.